United States Patent [19]

Nakamura et al.

[11] Patent Number: 5,375,996
[45] Date of Patent: Dec. 27, 1994

[54] COMBUSTION APPARATUS HAVING HEAT-RECIRCULATION FUNCTION

[75] Inventors: Sunao Nakamura; Tsuneo Matsudaira, both of Kawasaki, Japan; Felix J. Weinberg, London, England

[73] Assignee: NKK Corporation, Tokyo, Japan

[21] Appl. No.: 70,509

[22] Filed: Jun. 1, 1993

[30] Foreign Application Priority Data

Dec. 9, 1992 [JP] Japan ............................ 4-351524

[51] Int. Cl.$^5$ ............................................ F23L 7/00
[52] U.S. Cl. .................................... 431/115; 431/215; 431/328; 126/39 J; 126/92 R
[58] Field of Search ............... 431/326, 327, 328, 329, 431/115, 116, 215, 207; 126/39 J, 92 R, 92 AC, 39 R, 92 A

[56] References Cited

U.S. PATENT DOCUMENTS

| | | | |
|---|---|---|---|
| 2,921,176 | 1/1960 | Scofield | 431/328 |
| 3,270,798 | 9/1966 | Ruff | 431/329 |
| 3,299,938 | 1/1967 | Bally et al. | 126/92 R |
| 3,312,268 | 7/1967 | Milligan . | |
| 4,189,294 | 2/1980 | Rice | 126/39 J |
| 4,850,862 | 7/1989 | Bjerklie . | |
| 5,251,609 | 10/1993 | Thibault et al. | 126/39 J |

FOREIGN PATENT DOCUMENTS

| | | |
|---|---|---|
| 15668/70 | 12/1971 | Australia . |
| 0157432 | 10/1985 | European Pat. Off. . |
| WO91/08432 | 6/1991 | WIPO . |

*Primary Examiner*—James C. Yeung
*Attorney, Agent, or Firm*—Frishauf, Holtz, Goodman & Woodward

[57] ABSTRACT

The combustion apparatus having a heat-recirculating function comprises: a porous burner component (4) being made of permeable metallic material and having a first region (4a) through which a fuel-air mixture flows and is ejected therefrom into the combustion chamber at a velocity higher than the burning velocity of the fuel-air mixture to form a flame base on the periphery of the fuel-air mixture ejection area and having a second region (4b) being located adjacent to and outside of the first region to recover heat from high temperature product gas generated from the combustion of the fuel-air mixtures by red-heating the surface of the second region on the combustion chamber side while the product gas is penetrating through the burner component (4), wherein the heat recovered in the second region is conducted to the first region; the combustion chamber (5) being located to cover both the first region (4a) and the second region (4b) and enclosing these regions, and a cylindrical wall (6) separating a fuel-air mixture supply passage (9) from a product gas exhaust passage (10) by placing the fuel-air mixture supply passage at the inside thereof. Such a combustion apparatus having a heat-recirculating function comprises: a porous burner component (4) having more than one first region (4a) and more than one second region (4b); a combustion chamber (5); and more than one cylindrical wall (6).

17 Claims, 5 Drawing Sheets

FIG.1

FLAME A

FIG.2(A)

FLAME B

FIG.2(B)

FLAME C

COMBUSTION APPARATUS HAVING HEAT-RECIRCULATION FUNCTION

FIELD OF THE INVENTION

This invention relates to a combustion apparatus having a heat-recirculating function which preheats a fuel-air mixture using heat-recirculation from high temperature product gas.

DESCRIPTION OF THE RELATED ART

Many types of plane exothermic surface combustion burners have been developed and commercialized as a heat source for industrial use as well as household use because they easily generate radiant heat with low pollutant emission by adopting a porous burner component in a shape of flat plate, curved plate, or block provided with many gas passage pores and by combusting the fuel-air mixture, passed through the porous burner component, at the downstream surface of the component to form a uniform plane red-heat condition stably existing thereon.

Since the combustion apparatus using a surface combustion burner must form a combustion zone in the porous burner component near the surface thereof to make the plane red heat combustion zone a high radiation condition, the combustion apparatus with a surface combustion burner has the limitation that the fuel-air mixture cannot be ejected from the porous burner component at a higher velocity than the burning velocity of the mixture thereof.

The equivalence ratio of a flammable fuel-air mixture (the value of fuel-air ratio divided by theoretical fuel-air ratio) is in a range of 0.9 to 1.1 in order to gain higher emissive power. The adiabatic flame temperature within that range considerably exceeds the durable limit of, for example, metallic sintered fiber mat used as the porous burner component. As a result, most of the supplied heat has to be emitted as the high temperature product gas, and the radiation efficiency is only 25% (at equivalence ratio of 1) at the most.

Conventional combustion apparatuses of heat-recirculating type have been introduced to reduce the heat supply by preheating the fuel-air mixture with the recovered waste heat of combusted product gas and to substantially improve the radiation efficiency. These conventional combustion apparatuses are either of the type which provides heat exchange via a separation wall located between the fuel-air mixture supply passage and the product gas exhaust passage, or of the type which is provided with a specially designed heat exchanger or heat accumulator. Regarding the former type which provides heat exchange via a separation wall located between the fuel-air mixture supply passage and product gas exhaust passage, insufficient heat transfer area of the separation wall results an insufficient effect, so the size of the apparatus has to be enlarged. As for the latter type which is provided with a specially designed heat exchanger or heat accumulator, the added equipment complicates the structure of apparatus and enlarges the apparatus size, and furthermore the efficiency of heat exchanger and heat accumulator requires improvement.

Since conventional combustion apparatuses use the combustion method to form a plane red heat combustion zone in the porous burner component near the surface of fuel-air mixture ejection side thereof, the fuel-air mixture must be supplied at a rate below the combustion speed thereof. Accordingly, the conventional combustion apparatuses of heat-recirculating type have a disadvantage of limited combustion load.

SUMMARY OF THE INVENTION

The object of this invention is to provide a combustion apparatus having a heat-recirculating function, which combustion apparatus performs complete combustion with a low calorific lean fuel-air mixture, forms a uniform red heat plane, obtains a high radiation efficiency, has a simple configuration, and does not require an additional heat exchanger or heat accumulator.

The combustion apparatus having a heat-recirculating function comprises:

a porous burner component being made of permeable metallic material and having a first region through which the fuel-air mixture flows and is ejected therefrom into the combustion chamber at a velocity higher than the burning velocity of the mixture to form the flame base on the periphery of the mixture ejection area and having a second region being located adjacent to and outside of the first region to recover heat from a high temperature product gas generated from the combustion of the fuel-air mixture by red-heating the surface of the second region on the combustion chamber side while the product gas is penetrating through the burner component, wherein the heat recovered in the second region is conducted to the first region;

the combustion chamber being located to cover both the first region and the second region and enclosing these regions; and a cylindrical separation wall separating the fuel-air mixture supply passage from the product gas exhaust passage by placing the fuel-air mixture supply passage at the inside thereof.

The combustion apparatus having a heat-recirculating function comprises: a porous burner component having more than one firs region and more than one second region; a combustion chamber; and more than one cylindrical separation wall.

BRIEF DESCRIPTION OF THE DRAWING

FIG. 2 (A) illustrates lift flame shapes where flames propagate near to the peripheral annular part.

FIG. 2 (B) illustrates the lifted flame shape of a widening flame.

FIG. 2 (C) illustrates the stable flame.

DETAILED DESCRIPTION

Figure 1:
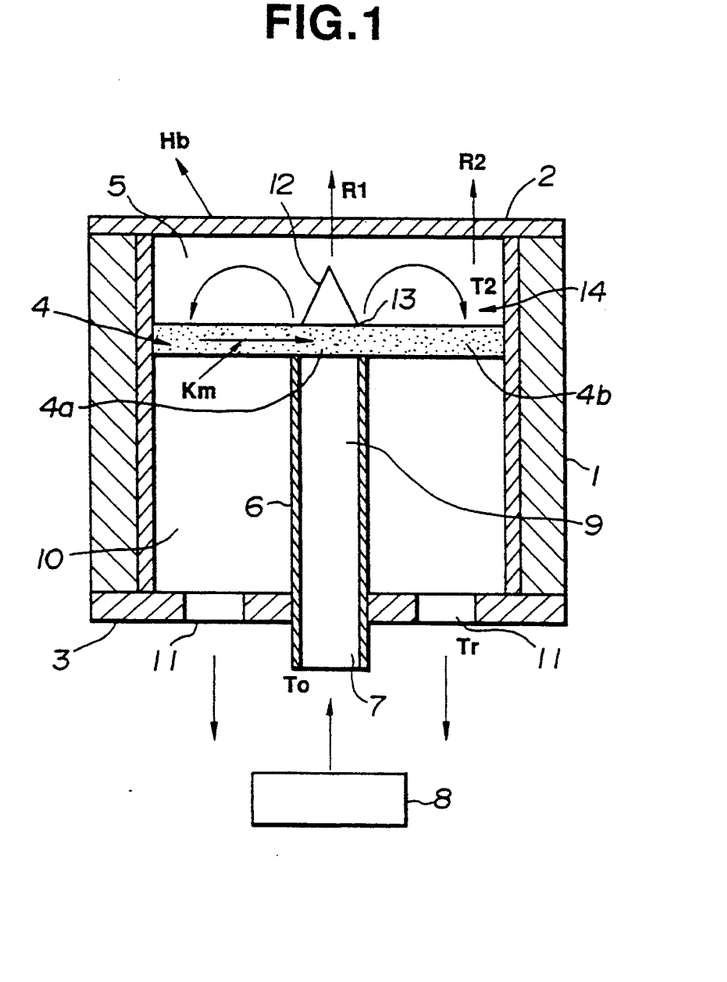
FIG. 1 shows is a schematic drawing of the core part of combustion apparatus of an embodiment of this invention.

FIG. 1 shows a schematic drawing of the core part of a combustion apparatus having a heat-recirculating function as an embodiment of this invention. In FIG. 1, the cylindrical enclosure 1 is made of insulation walls and forms the housing of the apparatus. The top of the cylindrical enclosure 1 is sealed by a transmission window 2, and the bottom of the cylindrical enclosure 1 is sealed by a bottom plate 3 to form a closed space therebetween. A porous burner component 4 is located beneath the transmission window 2 while keeping a specified distance therefrom to cover the lateral cross sectional area of the cylindrical enclosure 1. Accordingly, the enclosed space surrounded by the transmission window 2 and by the porous burner component 4 forms the combustion chamber 5. A cylindrical metallic pipe 6 is placed at the center of the enclosed space and beneath the bottom surface of the porous burner component 4 contacting the top edge of the cylindrical metallic pipe 6 to the bottom surface of the porous burner component 4. The bottom end of the cylindrical metallic pipe 6 penetrates the bottom plate 3 to form the fuel-air mixture supply opening 7. A fuel-air mixture supply apparatus 8 is connected to the supply opening 7.

The inside of the cylindrical metallic pipe 6 serves as the fuel-air mixture supply passage 9, and the outside thereof serves as the product gas exhaust passage 10. The product gas exhaust passage 10 is connected to the exhaust opening 11 provided on the bottom plate 3.

The transmission window 2 is made from a quartz glass which allows the high efficient penetration of infrared rays and heat rays emitted from the porous burner component 4 or is made of an opaque ceramic material which emits infrared rays of a specific wavelength when heated by the heat generated from the porous burner component. If a work is heated in a substantially closed space such as the inside space of a furnace provided with a closed exhaust system, such a heat ray transmission window 2 is not necessarily installed.

The porous burner component 4 is made of permeable metallic material and plays the role of a burner when it is mounted on the surface layer of the combustion chamber side. The porous burner component 4 may be the infrared burner type which is fabricated from a steel sheet having many small holes, the sintered metal type which is fabricated by sintering a machined powder of high melting point metal into specific shape, or a metallic sintered fiber mat prepared by forming a cotton-like structure of three-dimensionally interlaced stainless steel fiber or high melting point metallic fiber and by compressing the fiber structure to sinter under a non-oxidizing atmosphere. Of these, the metallic sintered fiber mat is particularly preferable for the porous burner component. The metallic sintered fiber mat has the structure of very long metallic fibers entangling to join one another by sintering, which fiber length is much larger than the dimension of individual combustion space. Consequently, a sintered metallic fiber mat having as high as 80 to 95% of porosity has sufficient strength for the burner component, and it is hard to collapse even after frequent repetitions of heat and cooling cycles. The term porosity means the ratio, % of the volume of burner component minus volume of metallic fiber to the volume of burner component.

The porous burner component (sintered metallic fiber mat) 4 is divided by the cylindrical separation wall 6 into the first region 4a which is positioned at the center area facing the supply passage 9 and the second region 4b which is the annular part facing the annular exhaust passage 10. The cylindrical wall is made of heat conductive material such as stainless steel.

The sintered metallic fiber mat 4 has a specially designed structure to inhibit the gas flow between the passages 9 and 10 along the lateral direction within the mat. Nevertheless, the sintered metallic fiber mat is formed to give a substantially continuous structure from the heat conduction point of view within the plane where the first region 4a and the second region 4b perpendicularly cross the thickness direction of mat. The sintered metallic fiber mat 4 functions as the burner plate which keeps the red-heat condition in the regions 4a and 4b facing the combustion chamber 5, particularly at the surface area, facing the combustion chamber, of the second region 4b which forms the annular part. Generally, the penetration flow pass area for the fuel-air mixture in the first region 4a is selected to have a narrower area than the penetration flow pass area for the high temperature product gas in the second region.

The fuel-air mixture supply apparatus 8 supplied the fuel-air mixture to the supply passage 9 after adjusting the flow rate (or flow velocity). The apparatus 8 supplies the fuel-air mixture to the supply passage 9 at such a rate that the flow velocity of the mixture passing through the porous burner component 4 into the combustion chamber 5 is higher than the burning velocity of the fuel-air mixture.

The combustion chamber 5 is separated from external atmosphere by a sealing window 2 made of a material such as quartz having a high transmittance of infrared and heat rays, which sealing window faces the sintered metallic fiber mat 4 to cover the combustion chamber 5. As a result, fuel-air mixture is ejected from the center part 4a of the mat, and all the high temperature product gas generated by the combustion reaction in the combustion chamber 5 flows through the annular part 4b of the periphery of mat 4 to make the annular part 4b red hot. The product gas passed through the annular part 4b is introduced into the exhaust passage 10. An igniter (not shown) is mounted near the surface of the sintered metallic fiber mat 4 in the combustion chamber 5.

In the combustion apparatus of this invention having the configuration described above, a flammable fuel-air mixture at ambient temperature enters from the supply opening 7 into the supply passage 9, then the mixture passes through the center part 4a of the mat 4 to reach the combustion chamber 5. While crossing the center part 4a of the mat 4, the fuel-air mixture is preheated by the heat of mat 4. The flow velocity of the fuel-air mixture from the center part 4a of the mat 4 is controlled at a rate higher than the burning velocity of the fuel-air mixture (higher than 30 cm/sec). In the combustion chamber 5, the fuel-air mixture being ejected from the mat center part 4a forms the flame 12 within the combustion chamber 5. The flame base 13 is positioned at the periphery of the center part 4a, and the flame is held stable by raising the temperature of the part 4a. During the step, the flow velocity of the fuel-air mixture is set to a value higher than the burning velocity of the fuel-air mixture, so the center part of the mat, (the first region), does not become red-hot. When the high temperature gas generated by combustion passes through the annular part 4b, the total area of the annular part 4b becomes red-hot. The emissive power R2 emitted from the annular part 4b and the emissive power R1 emitted from the high temperature gas are radiated to outside of the combustion chamber through the sealing window 2. The product gas passed through the peripheral annular part 4b is sent to the exhaust opening 11 via the exhaust gas passage 10.

The method described above only requires the flame base 13 to be stably held on the mat center part 4a, and the flame may be floated above the mat. Accordingly, this type of combustion allows the fuel-air mixture to eject into the combustion chamber at an ejection rate (representative velocity) significantly higher than that of the conventional combustion method which needs to keep surface combustion, and allows a heavy load combustion.

During the period for the high temperature product gas to pass through the annular part 4b of the sintered fiber mat, the heat conductive fiber structure of the mat recovers waste heat from the product gas, and the recovered heat is circulated to the mat center part 4a by the heat conduction of the heat conductive fiber of the mat. Accordingly, the fuel-air mixture at ambient temperature entered from the supply opening 7 passes from the supply passage 9 through the center part 4a of the sintered fiber mat 4, which center part 4a was heated by waste heat in a manner described above, and enters the combustion chamber. In this procedure, when the fuel-air mixture reaches the combustion chamber, the mixture has been sufficiently heated by the product gas, and the amount of heat released to outside along with the product gas from the exhaust opening 11 becomes very small.

According to this invention, waste heat of the high temperature product gas is recovered in the second region of the porous burner component (permeable metallic material), and the recovered heat is transferred from the second region to the first region to heat the first region by direct heat conduction, and the fuel-air mixture passing through the first region is preheated. Consequently, the efficient transfer of recovered heat within the porous burner component is a key to the combustion in this invention.

In the embodiment of this invention described above, the sintered metallic fiber mat preferably has a porous textured structure by interlacing the fiber exclusively in the plane direction and by sintering them to form stratified fiber layers in the thickness direction. With the fiber structure, the product gas penetrating the stratified porous mat gives efficient heat recovery from the product gas to the mat and gives efficient heat supply to the mat surface in the combustion zone and to the fuel-air mixture. In addition, fibers oriented along the plane direction significantly contribute to the heat conduction to offer markedly high thermal conductivity between the mat parts on the first region and second region, particularly in the plane direction of the mat, and to offer the favorable transfer of recovered heat by the direct heat conduction from the first region to the second region. As a result, the total efficiency of heat-recirculation is increased considerably.

FIG. 1 shows the single mat 4. Alternatively, an additional layer of sintered metallic mat may be arranged beneath the mat 4 attaching thereto or in parallel while keeping a specific distance, or more than one additional layer of sintered metallic mat may be employed in such a parallel arrangement. The additional sintered metallic mats also recover waste heat from the product gas passing through the peripheral annular part (the second region) which is separated by the metallic separation wall 6, and receive the recovered heat at the central part (the first region) by heat conduction to preheat the fuel-air mixture.

Figure 2A:
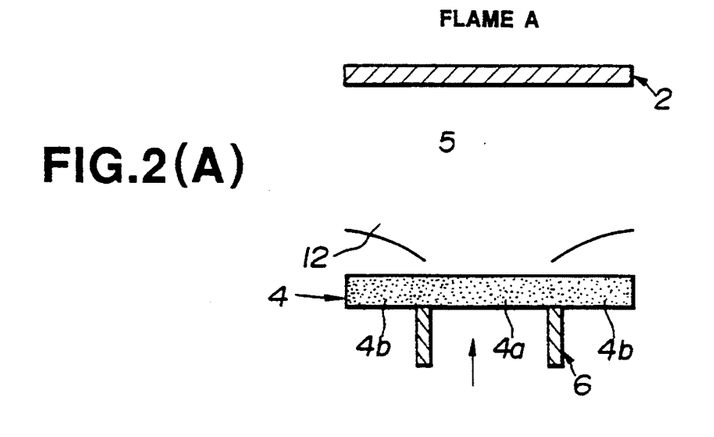
Figure 2B:
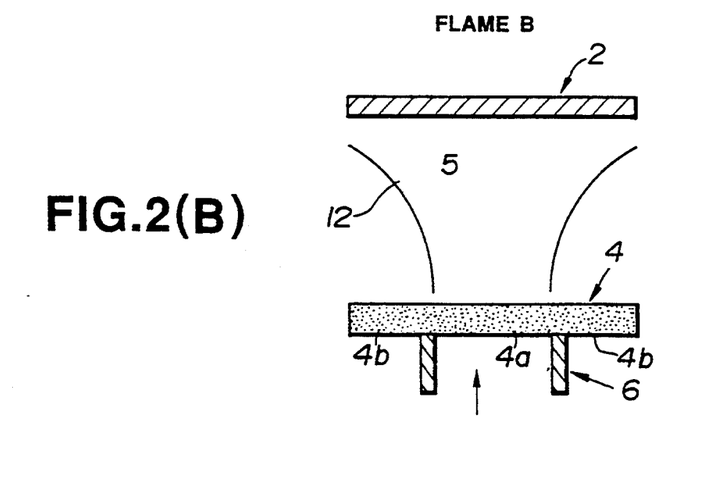
Figure 2C:
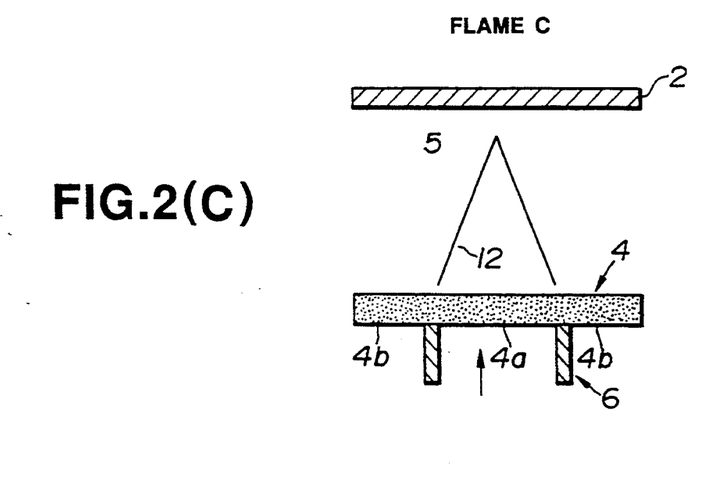

FIG. 2 shows the schematic flame shapes in three typical combustion conditions within the combustion chamber 5. The symbols used in FIG. 2 correspond to those in FIG. 1. According to this invention, the flow velocity of fuel-air mixture from the center part 4a of the mat 4 is adjusted to form a conical shape combustion flame. In concrete terms, the supply rate of fuel-air mixture is adjusted to keep a stable combustion forming a flue flame as shown in the flame C (FIG. 2(C)) while the base of the flame 12 is supported on the peripheral part of the mat center part 4a on the combustion chamber side surface and while the core of the flame 12 is floating from the mat surface. That condition is obtained by adjusting the flow velocity to a relatively high level.

When the flow velocity further increases or when the fuel-air mixture becomes lean, the flame 12 turns to show a divergent pattern of the flame B (FIG. 2 (B)) following the relation between burning velocity and flow velocity of fuel-air mixture, then further becomes similar to the flame A (FIG 2 (A)) where the broadening flame approaches to the peripheral annular part 4b.

Figure 3:
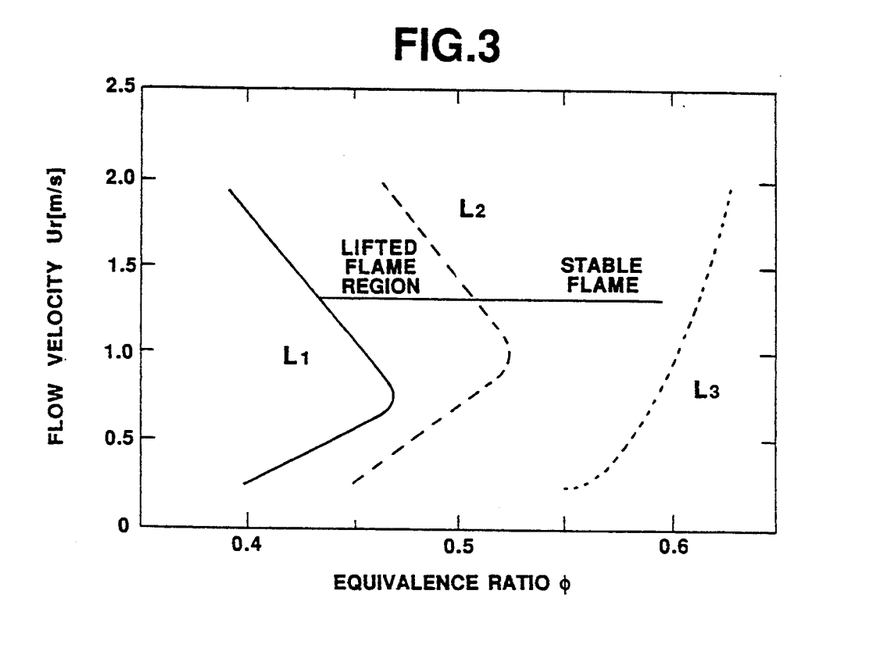
FIG. 3 is a graph which shows the data of lean side combustible limit of fuel-air mixture, which data were obtained from the combustion experiment using an experimental apparatus having the function of this invention.

FIG. 3 shows the combustion characteristics of lean combustible limit (blow-off limit) of the fuel-air mixture, which data were obtained from the combustion experiment using an experimental apparatus having the function of this invention. In the experimental apparatus, the burner plate was a sintered stainless steel fiber mat having 20 mm of inside diameter of fuel-air mixture ejection nozzle at the center part 4a of the burner plate. The number of mats was two including the burner plate.

The horizontal axis of FIG. 3 represents the equivalence ratio $\Phi$, (inverse number of excess air ratio=fuel to air ratio of the supply fuel-air mixture divided by theoretical fuel to air ratio; $\Phi=1.0$ corresponds to the theoretical mixing ratio smaller $\Phi$ value than 1.0 means more lean fuel-air mixture). The vertical axis of the figure represents the flow velocity (representative velocity) of fuel-air mixture at the exit surface of burner plate 4.

In FIG. 3, characteristic L1 indicates the lean flammable limit, L2 indicates the combustion limit of stable flame shown as the flame C (FIG. 2 (C)), and L3 indicates the flammable limit under the condition of non-recovery of waste heat and non-heat re-circulation. A feature of the apparatus of this invention is the capability to significantly increase the flow velocity. The experimental apparatus allowed 25–300 cm/sec of flow velocity of fuel-air mixture to carry combustion, while the conventional surface combustion is limited to 5–25 cm/sec of the flow velocity.

As clearly shown in FIG. 3, the experimental apparatus recovers waste heat and transmits heat circulation. As a result, the lean flammable limit (characteristic L1) largely shifts toward lean side compared with the characteristic L3 of non-heat recirculation. For example, the equivalence ratio Φ at the lean side flammable limit is 0.39 at 2 m/sec of flow velocity Ur.

Figure 4:
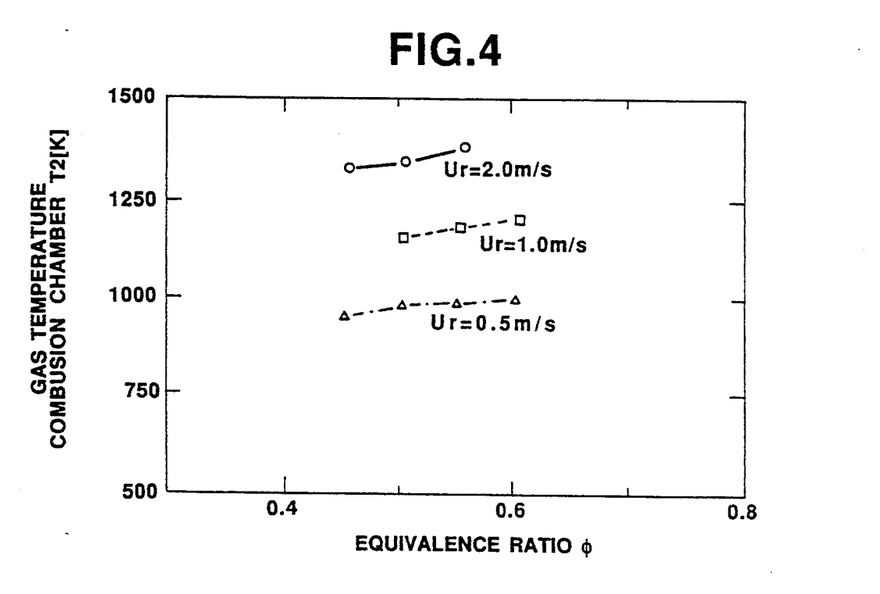
FIG. 4 is a graph which shows a correlation of gas temperature, T2, in the combustion chamber and equivalence ratio, $\Phi$, using the parameter off flow rate, Ur, of fuel-air mixture.

FIG. 4 shows a correlation of temperature, T2, at downstream side surface of the mat (at the position 14 in FIG. 1) and equivalence ratio, Φ, using the parameter of flow velocity, Ur, of fuel-air mixture. The data were obtained from the combustion experiment using an experimental apparatus which employed four layers of sintered stainless steel mats having 20 mm of inside diameter and 91 mm of outside diameter of ejection nozzle at the center part 4a. FIG. 4 identifies that all observed values of flow velocity, Ur, give a sufficiently high temperature on the mat surface of downstream side under a lean condition of 0.45–0.6 of equivalence ratio, Φ. The result comes from the increase of combusted gas enthalpy owing to the heat recirculation within the combustion chamber by the heat conduction within the mat. For example, under a lean condition of equivalence ratio Φ=0.45 and flow velocity Ur=2.0 m/sec and the condition of non-recirculation of heat, the flame will be blown-off. However, the experimental apparatus using four layers of sintered stainless steel mat gives a temperature as high as 1300° K. of T2 under the above described severe condition.

Figure 5:
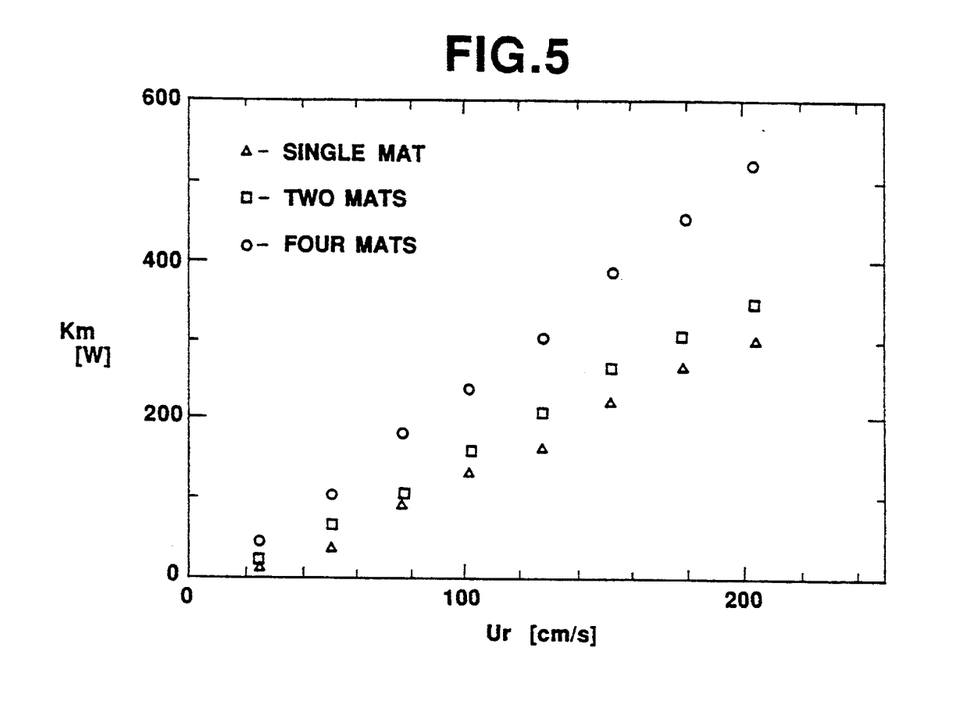
FIG. 5 is a graph which shows a correlation of heat-recirculating rate, Km, and flow rate, Ur, using the parameter of number of mats.

FIG. 5 shows a correlation of heat-recirculating rate, Km, and flow velocity, Ur, using the parameters of number of mats and equivalence ratio, Φ. The data were obtained from the combustion experiment using the experimental apparatus which employed sintered stainless steel mats having 20 mm of inside diameter and 91 mm of outside diameter of ejection nozzle at the center part 4a.

In FIG. 5, the points of white triangle (△) indicate a single mat, the points of white square (□) indicate two mats, and the points of white circle (○) indicate four mats. The correlation was obtained at the equivalence ratio, Φ, in a range of 0.4 to 0.6. As clearly shown in FIG. 5, heat-recirculating rate increases with the increase of flow velocity, Ur, and the increase of number of mats.

Figure 6:
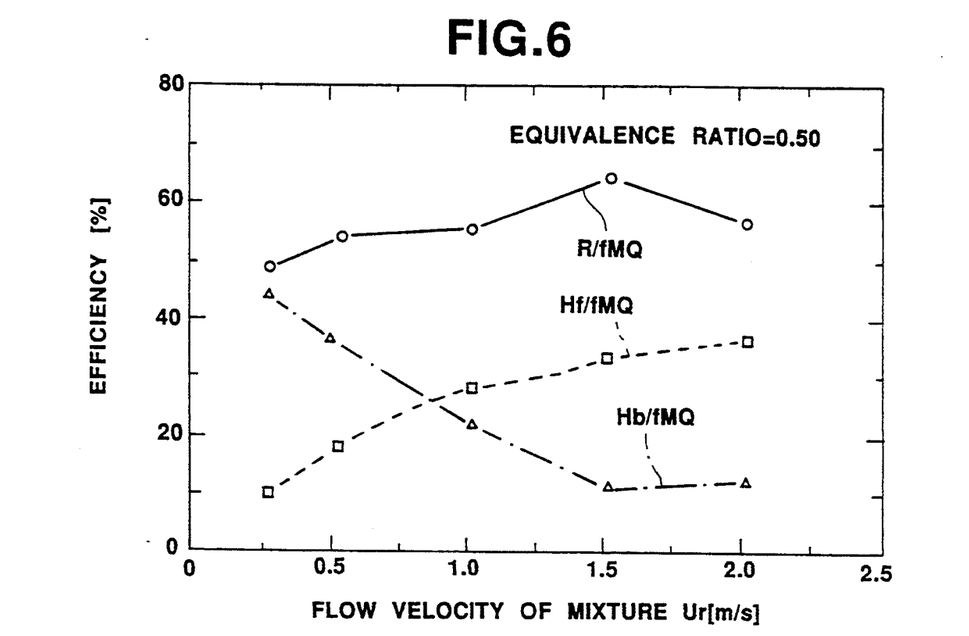
FIG. 6 is a graph which shows a correlation between the efficiency of supplied heat, fMQ, to emissive power, R, emitted from the burner combustion zone; the efficiency of supplied heat, fMQ, to convention heat rate, Hb; the ratio of heat, Hf, carried by product gas to supplied heat, fMQ, and the flow rate, Ur, of fuel-air mixture from the mat.

FIG. 6 shows a correlation among the efficiency of supplied heat, fMQ, to emissive power, R, emitted from the burner combustion zone; the efficiency of supplied heat, fMQ, to convection heat rate, Hb; the ratio of heat, Hf, carried by product gas to supplied heat, fMQ; and the flow velocity, Ur, of fuel-air mixture from mat. The data were obtained from the combustion experiment using the experimental apparatus which employed four mats having 20 mm of inside diameter and 91 mm of outside diameter of ejection nozzle at the center part 4a. The equivalence ratio, Φ, was kept constant at 0.50.

As shown in FIG. 6, the radiation efficiency, R/fMQ, increases with the increase of flow velocity, Ur. The convection efficiency, Hb/fMQ, decreases with the increase of flow velocity, Ur. The loss ratio, Hf/fMQ, taken out by exhaust gas increases with the increase of flow velocity, Ur. The increase of radiation efficiency, R/fMQ, as the effective use of heat and the reduction of convection efficiency, Hb/fMQ, are induced from the phenomenon that the increase of flow velocity, Ur, drives the flame near to the at surface of downstream side within the combustion chamber. This movement of flame allows easier conversion of combusted gas enthalpy into radiation more efficiently.

Figure 7:
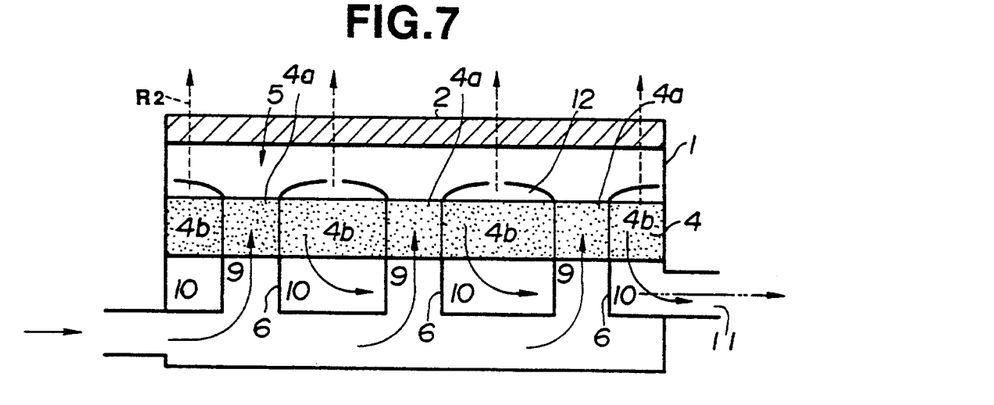
FIG. 7 is shows a schematic drawing of the core part of combustion apparatus of another embodiment of this invention.

FIG. 7 illustrates another embodiment of this invention. More than one first region (fuel-air mixture ejection port) 4a are formed by arranging cylindrical separation walls (supply passage pipes) 6 at a specific distance on the sintered metallic fiber mat 4 having a relatively large area. With the plane plural port combustion apparatus, fuel-air mixture is ejected from more than one ejection port 4a formed on the large area mat and arranged at a specific spacing to combust the mixture completely in the combustion chamber 5 sealed by the transmission window 2. The generated high temperature combusted gas is passed through the mat plane (the second region) 4b between the ejection ports 4a to redheat and to recover the heat from combusted gas. The recovered heat is circulated to the mat in the first region 4a by the heat conduction of mat to preheat the fuel-air mixture. The symbols used in FIG. 7 correspond to those in FIG. 1.

Figure 8:
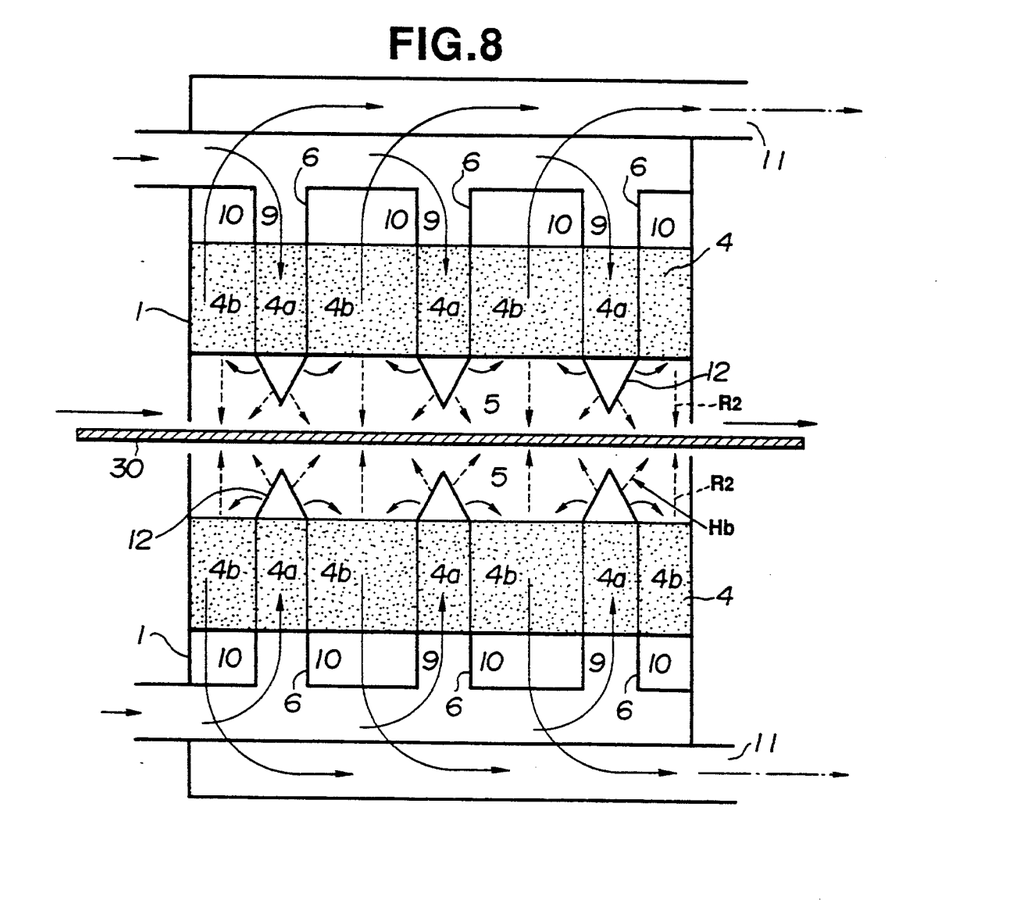
FIG. 8 is shows a schematic drawing of the core part of combustion apparatus of a further embodiment of this invention.

FIG. 8 illustrates a further embodiment of this invention preferable to the heat treatment of steel sheets. In this apparatus, the heating apparatus is fabricated by arranging counter-flow type plane plural port combustion burners, the configuration of which apparatus is similar to that in FIG. 7 except the transmitting window is eliminated. The steel sheet 30 to be heated passes through the space between the rows of facing burners. Leakage of the combusted gas through the inlet and outlet gaps of steel sheet 30 passage to the outside of the enclosure 1 is prevented by sucking it with the product gas blower at the downstream of the exhaust opening 10. Symbols in FIG. 8 correspond to those in FIG. 7.

While the invention has been described in detail and with reference to specific embodiments and experimental apparatus thereof, it will be apparent to one skilled in the art that various changes and modifications can be made thereon without departing from the spirit and scope of the claim. For instance, the shape of the burner plate and individual heat conductive layers is arbitrarily selected such as to circular, rectangular, or polygon, and the plane is not necessarily flat and curved face or folded face may be adopted. The sealing window need not be installed when the object to be heated is located within a closed space.

As described above, the heat-recirculating combustion apparatus of this invention heats the surface of permeable metallic material (mat) at the product gas exit side to a red hot state by high temperature combusted gas, so the apparatus can use a lean fuel mixture (low calorific gas) to maintain a stable plane red hot condition compared with the conventional combustion apparatus using a surface combustion burner. In addition, the apparatus of this invention achieves heavy load combustion above the limit of fuel-air flow rate in the conventional apparatuses, and significantly increases the radiation efficiency to reduce the heat loss.

Furthermore, the combustion apparatus with heat-recirculating function of this invention employs the heat conductive permeable metallic component made of, for example, sintered metallic fiber mat to recover the heat directly from the high temperature product gas passing through the surface combustion part, and to preheat the fuel-air mixture through the recirculation of recovered heat using the heat conduction within the permeable metallic component. As a result, the combustion apparatus of this invention provides higher radiation efficiency with a smaller apparatus than the apparatus providing heat circulation using the heat exchange through a separation wall on the cylindrical combustion cylinder. Also the apparatus of this invention allows the recirculation of sufficient amount of heat by recovering heat from the product gas at a high efficiency. The apparatus of this invention further provides a compact heat recovery system in the combustion apparatus without employing a special heat exchanger and accumulator. Since the apparatus of this invention is capable of heat-recirculation with the burner, the structure of the combustion apparatus having a heat-recirculating function is relatively simple.

We claim:

1. A combustion apparatus having a heat-recirculating function, comprising:

a combustion chamber;

a housing, at least an upper portion of the housing surrounding the combustion chamber;

said housing having an upper side wall portion surrounding the combustion chamber, a bottom wall arranged at the bottom of the combustion chamber, and being made of a porous burner component, and a top wall arranged at the top of the combustion chamber and being transmissible to an infrared ray;

the porous burner component of the bottom wall being made of a gas permeable metallic layer and being heat conductive;

a lower portion of the housing comprising a lower side wall portion extending downwardly from the upper side wall portion, and having a bottom plate at a lower end of the lower side wall portion;

a pipe attached to a bottom surface of a substantially central portion of the porous burner component and extending downwardly, the pipe having an inside portion forming a fuel-air mixture supply passageway, and the pipe having a lower end passing through the bottom plate;

the porous burner component having a first region located over the fuel-air mixture supply passageway and through which a fuel-air mixture from the fuel-air mixture supply passageway permeates at a velocity higher than a burning velocity of the fuel-air mixture and jets out into the combustion chamber;

the lower side wall portion of the housing being spaced from and surrounding an outside of the pipe to provide a space therebetween so as to form a hollow annular space between the pipe and the lower side wall portion of the housing, the hollow annular space forming an exhaust passageway for product gas;

the upper side wall portion of the housing surrounding an outer periphery of the porous burner component and being sealingly connected to the top wall;

the porous burner component having a second region located over the exhaust passageway and through which the product gas flows, a red heated surface being formed on the second region at a side of the porous burner component which faces the combustion chamber;

a fuel-air mixture supply device being coupled to the pipe; and at least one exhaust opening arranged in communication with the exhaust passageway.

2. The apparatus of claim 1, wherein the porous burner component comprises a substantially continuous metallic sintered layer.

3. The apparatus of claim 1, wherein the porous burner component comprises at least two layers.

4. The apparatus of claim 1, wherein the pipe is a heat conductive cylindrical metal pipe.

5. The apparatus of claim 1, wherein the first region of the porous burner component through which the fuel-air mixture permeates is smaller than the second region of the porous burner component through which the product gas flows.

6. The apparatus of claim 4, wherein the combustion chamber and the lower portion of the housing are both cylindrical.

7. The apparatus of claim 6, wherein two exhaust openings are formed in the bottom plate.

8. A combustion apparatus having a heat-recirculating function, comprising:

a combustion chamber;

a housing, at least an upper portion of the housing surrounding the combustion chamber, said housing having an upper side wall portion surrounding the combustion chamber, including a bottom wall arranged at the bottom of the combustion chamber and made of a porous burner component, and a top wall arranged at the top of the combustion chamber and transmissible to an infrared ray;

the porous burner component of the bottom wall being made of a gas permeable metallic layer and being heat conductive;

a lower portion of the housing comprising a lower side wall portion extending downwardly from the upper side wall portion, and having a bottom plate at a lower end of the lower side wall portion;

a plurality of pipes attached to plural portions of a bottom surface of the porous burner component and extending downwardly, each of the pipes having an inside portion forming a fuel-air mixture supply passageway, and each of the pipes passing through the bottom plate;

the porous burner component having two or more first regions located over the fuel-air mixture supply passageway and through which a fuel-air mixture from the fuel-air mixture supply passageway permeates at a velocity higher than a burning velocity of the fuel-air mixture passing through each of the first regions and jets out in the combustion chamber;

the lower side wall portion of the housing being spaced from and surrounding an outside of the pipes to provide a space therebetween so as to form a hollow space between each of the pipes and the lower side wall portion of the housing, the annular space forming an exhaust passageway for product gas;

the upper side wall portion of the housing surrounding an outer periphery of the porous burner component and being connected to the top wall;

the porous burner component having a second region located over the exhaust passageway and through which the product gas flows, a red heated surface being formed on the second region at a side of the porous burner component which faces the combustion chamber;

a fuel-air mixture supply pipe being coupled to the pipes to feed the fuel-air mixture; and at least one exhaust opening arranged in communication with the exhaust passageway.

9. The apparatus of claim 8, wherein the porous burner component comprises a substantially continuous metallic sintered layer.

10. The apparatus of claim 8, wherein the porous burner comprises two or more layers.

11. The apparatus of claim 8, wherein the pipes are heat conductive cylindrical metal pipes.

12. The apparatus of claim 8, wherein the first region of the porous burner component through which the fuel-air mixture permeates is smaller than the second region through which the product gas flows.

13. The apparatus of claim 8, wherein the top wall of the chamber wall is made of quartz glass.

14. The apparatus of claim 8, wherein the porous burner component comprises a metallic sintered fiber mat having a porosity of 80 to 95%.

15. The apparatus of claim 11, wherein two exhaust openings are formed in the bottom plate.

16. The apparatus of claim 15, wherein the combustion chamber and the lower portion are both cylindrical.

17. The apparatus of claim 16, wherein the porous burner component comprises a substantially continuous metallic sintered layer having a porosity of 80 to 95%.

* * * * *